US010579859B2

(12) United States Patent
Kimiyama et al.

(10) Patent No.: US 10,579,859 B2
(45) Date of Patent: Mar. 3, 2020

(54) IMAGE PROCESSING APPARATUS, IMAGE PROCESSING SYSTEM, IMAGE PROCESSING METHOD, AND PROGRAM

(71) Applicants: Kabushiki Kaisha Toshiba, Minato-ku (JP); Toshiba Infrastructure Systems & Solutions Corporation, Kawasaki-shi (JP)

(72) Inventors: Kenji Kimiyama, Kawasaki (JP); Yoshihiko Suzuki, Suginami (JP); Takuya Futagami, Kawasaki (JP)

(73) Assignees: Kabushiki Kaisha Toshiba, Minato-ku (JP); Toshiba Infrastructure Systems & Solutions Corporation, Kawasaki-shi (JP)

(*) Notice: Subject to any disclaimer, the term of this patent is extended or adjusted under 35 U.S.C. 154(b) by 183 days.

(21) Appl. No.: 15/913,954

(22) Filed: Mar. 7, 2018

(65) Prior Publication Data
US 2018/0268199 A1 Sep. 20, 2018

(30) Foreign Application Priority Data

Mar. 15, 2017 (JP) .................. 2017-050498

(51) Int. Cl.
*G06K 9/00* (2006.01)
*G06K 9/20* (2006.01)
(Continued)

(52) U.S. Cl.
CPC ..... *G06K 9/00208* (2013.01); *G06K 9/00818* (2013.01); *G06K 9/209* (2013.01);
(Continued)

(58) Field of Classification Search
CPC ...... G06K 9/00208; G06K 9/325; G06K 9/40; G06K 9/42; G06K 9/00818; G06K 9/209; G06K 2209/19
See application file for complete search history.

(56) References Cited

U.S. PATENT DOCUMENTS

| 6,047,893 A | 4/2000 | Saporetti |
| 6,377,698 B1 | 4/2002 | Cumoli et al. |

(Continued)

FOREIGN PATENT DOCUMENTS

| JP | 11-306282 | 11/1999 |
| JP | 2000-67159 | 3/2000 |

(Continued)

OTHER PUBLICATIONS

Nguyen, Tam, GueeSang Lee, Huan Nguyen Nhu, and Thuc Nguyen Dinh. "Color structure recovering in strong specular text regions." In 2015 13th International Conference on Document Analysis and Recognition (ICDAR), pp. 961-965. IEEE, 2015. (Year: 2015).*

(Continued)

*Primary Examiner* — Carol Wang
(74) *Attorney, Agent, or Firm* — Oblon, McClelland, Maier & Neustadt, L.L.P.

(57) ABSTRACT

An image processing apparatus has a processing circuit. The processing circuit functions as a three-dimensional data generation unit, a two-dimensional data generation unit, and a recognition image generation unit. The three-dimensional data generation unit generates three-dimensional data of an object t on the basis of an image of the object on which object information represented by a character or a symbol is attached, and a distance image indicating a distance between a reference position and the object for each pixel. The two-dimensional data generation unit flattens the three-dimensional data generated by the three-dimensional data generation unit to generate two-dimensional data. The rec- (Continued)

ognition image generation unit generates a recognition image which is used to recognize the object information, on the basis of the two-dimensional data generated by two-dimensional data generation unit.

14 Claims, 10 Drawing Sheets

(51) Int. Cl.
  *G06K 9/32* (2006.01)
  *G06K 9/40* (2006.01)
  *G06K 9/42* (2006.01)

(52) U.S. Cl.
  CPC .............. *G06K 9/325* (2013.01); *G06K 9/40* (2013.01); *G06K 9/42* (2013.01); *G06K 2209/19* (2013.01)

(56) References Cited

U.S. PATENT DOCUMENTS

| | | | | |
|---|---|---|---|---|
| 7,463,772 | B1* | 12/2008 | Lefevere | G06K 9/3283 345/419 |
| 9,563,958 | B1* | 2/2017 | Choi | G06T 7/586 |
| 9,613,293 | B2* | 4/2017 | Choi | G06T 5/003 |
| 2007/0025612 | A1 | 2/2007 | Iwasaki et al. | |
| 2007/0257934 | A1* | 11/2007 | Doermann | G06K 9/36 345/606 |
| 2008/0069433 | A1* | 3/2008 | Corcoran | G06K 9/40 382/149 |
| 2013/0088491 | A1* | 4/2013 | Hobbs | G06T 13/80 345/423 |
| 2013/0223673 | A1 | 8/2013 | Davis et al. | |
| 2014/0362188 | A1* | 12/2014 | Yokokawa | A63F 13/42 348/47 |
| 2016/0364634 | A1 | 12/2016 | Davis et al. | |
| 2018/0285611 | A1* | 10/2018 | D'Ercoli | G06K 7/10722 |

FOREIGN PATENT DOCUMENTS

| | | |
|---|---|---|
| JP | 2001-53966 | 2/2001 |
| JP | 2011-170536 | 9/2011 |
| JP | 2012-22474 | 2/2012 |
| JP | 2016-123043 | 7/2016 |
| JP | 2017-216497 | 12/2017 |
| WO | WO 01/26041 A1 | 4/2001 |

OTHER PUBLICATIONS

Grossmann, Ruth, Nahum Kiryati, and Ron Kimmel. "Computational surface flattening: a voxel-based approach." IEEE Transactions on Pattern Analysis and Machine Intelligence 24, No. 4 (2002): 433-441. (Year: 2002).*

Yang, Chih-Yuan, Jia-Bin Huang, and Ming-Hsuan Yang. "Exploiting self-similarities for single frame super-resolution." In Asian conference on computer vision, pp. 497-510. Springer, Berlin, Heidelberg, 2010. (Year: 2010).*

Xu, Shu-Chang, Xiuzi Ye, Yin Wu, and Sanyuan Zhang. "Highlight detection and removal based on chromaticity." In International Conference Image Analysis and Recognition, pp. 199-206. Springer, Berlin, Heidelberg, 2005. (Year: 2005).*

Quan, Long, and Heung-Yeung Shum. "Highlight removal by illumination-constrained inpainting." In Proceedings Ninth IEEE International Conference on Computer Vision, pp. 164-169. IEEE, 2003. (Year: 2003).*

Kato, Yuji, Daisuke Deguchi, Tomokazu Takahashi, Ichiro Ide, and Hiroshi Murase. "Low resolution QR-code recognition by applying super-resolution using the property of QR-codes." In 2011 International Conference on Document Analysis and Recognition, pp. 992-996. IEEE, 2011. (Year: 2011).*

Feris, Rogerio, Ramesh Raskar, Kar-Han Tan, and Matthew Turk. "Specular highlights detection and reduction with multi-flash photography." Journal of the Brazilian Computer Society12, No. 1 (2006): 35-42. (Year: 2006).*

Extended Search Report dated Aug. 6, 2018 in European Patent Application No. 18160898.5.

* cited by examiner

IMAGE PROCESSING APPARATUS, IMAGE PROCESSING SYSTEM, IMAGE PROCESSING METHOD, AND PROGRAM

CROSS-REFERENCE TO RELATED APPLICATION

This application is based upon and claims the benefit of priority from Japanese Patent Application No. 2017-050498, filed on Mar. 15, 2017, the entire contents of which are incorporated herein by reference.

FIELD

Exemplary embodiments described herein relate to image processing apparatuses, image processing systems, image processing methods, and programs.

BACKGROUND

In the field of logistics, the optical character recognition (OCR) apparatus has in recent years been used to recognize a shipping label written on an irregular package. In the case where a package is made of a paper or plastic bag, the package is deformed, depending on the shape of a shipping item, so that a shipping label written on the package is also deformed.

If the shipping label is not significantly deformed, the OCR apparatus can correct the deformation of an image of the shipping label by image processing to recognize address information written on the shipping label. However, if the shipping label is significantly deformed, the OCR apparatus may falsely recognize or fail to recognize the shipping label.

DETAILED DESCRIPTION

An image processing apparatus in accordance with an embodiment has a processing circuit. The processing circuit functions as a three-dimensional data generation unit, a two-dimensional data generation unit, and a recognition image generation unit. The three-dimensional data generation unit generates three-dimensional data of an object on the basis of an image of the object on which object information represented by a character or a symbol is attached, and a distance image indicating a distance between a reference position and the object for each pixel. The two-dimensional data generation unit generates two-dimensional data by flattening the three-dimensional data generated by the three-dimensional data generation unit. The recognition image generation unit generates a recognition image which is used to recognize the object information, on the basis of the two-dimensional data generated by the two-dimensional data generation unit.

Image processing apparatuses, image processing systems, image processing methods, and programs in accordance with embodiments will now be described with reference to the accompanying drawings.

First Embodiment

Figure 1:
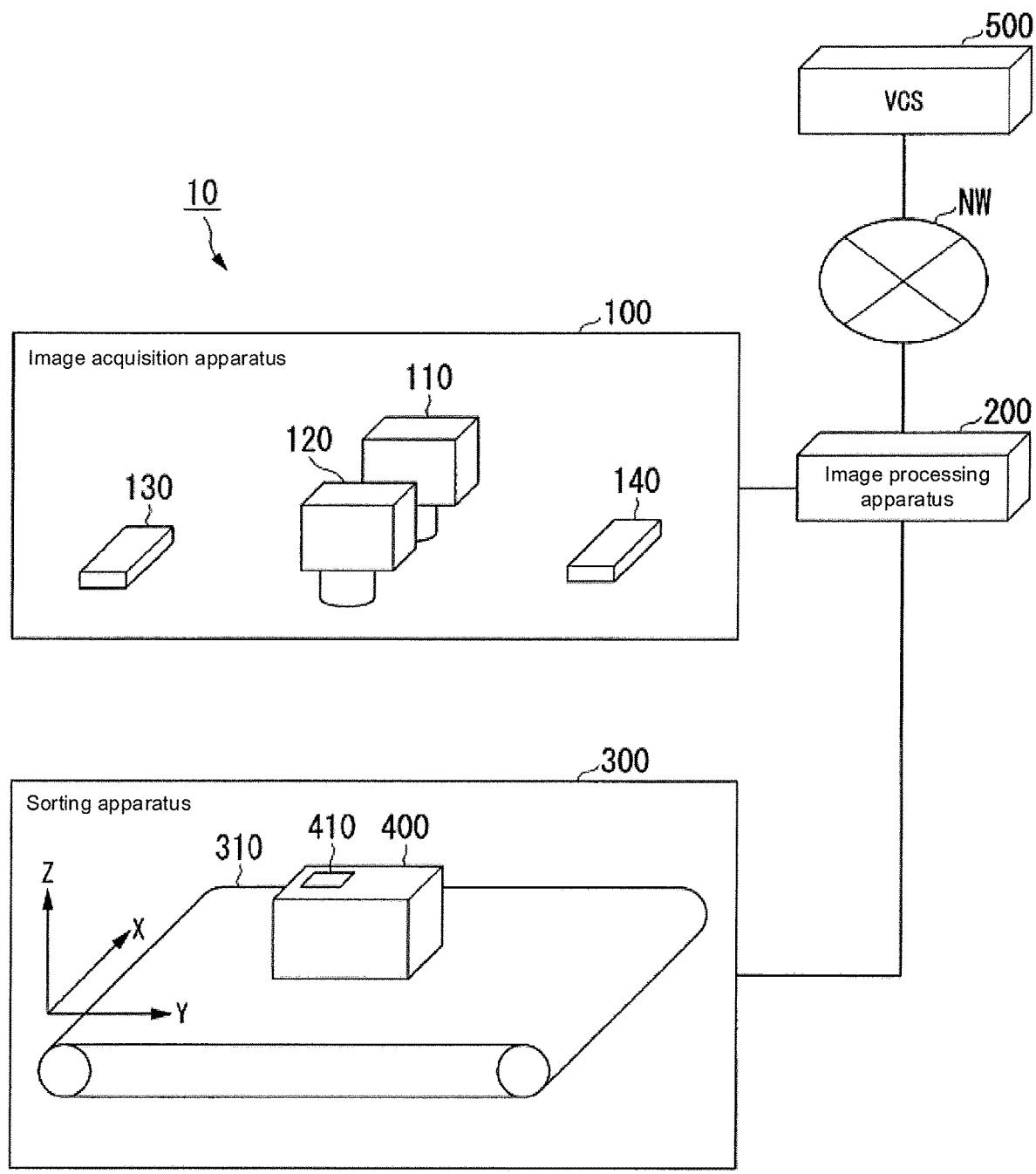
FIG. 1 is a diagram showing an overall configuration of an image processing system 10 in accordance with a first embodiment.

FIG. 1 is a diagram showing an overall configuration of an image processing system 10 in accordance with a first embodiment.

As shown in FIG. 1, the image processing system 10 of this embodiment includes an image acquisition apparatus 100, an image processing apparatus 200, a sorting apparatus 300, and a video coding system (VCS) 500.

The image processing apparatus 200 is communicatively coupled to the image acquisition apparatus 100 and the sorting apparatus 300. The image processing apparatus 200 is also coupled to the VCS 500 through a network NW. The network NW is, for example, a wide area network (WAN), a local area network (LAN), etc.

The image acquisition apparatus 100 includes a first image acquisition unit 110, a second image acquisition unit 120, an illumination device 130, and an illumination device 140. The first image acquisition unit 110 is, for example, a line scan sensor including a linear array of charge-coupled device (CCD) or complementary metal oxide semiconductor (CMOS) sensors. The illumination devices 130 and 140 illuminate a package (example object) 400 on a conveyor belt 310. The first image acquisition unit 110 performs successive shooting to acquire an image of the package 400 as it is being transported by the conveyor belt 310 at a constant speed. The image acquisition apparatus 100 sends the image of the package 400 acquired by the first image acquisition unit 110 to the image processing apparatus 200.

Figure 2:
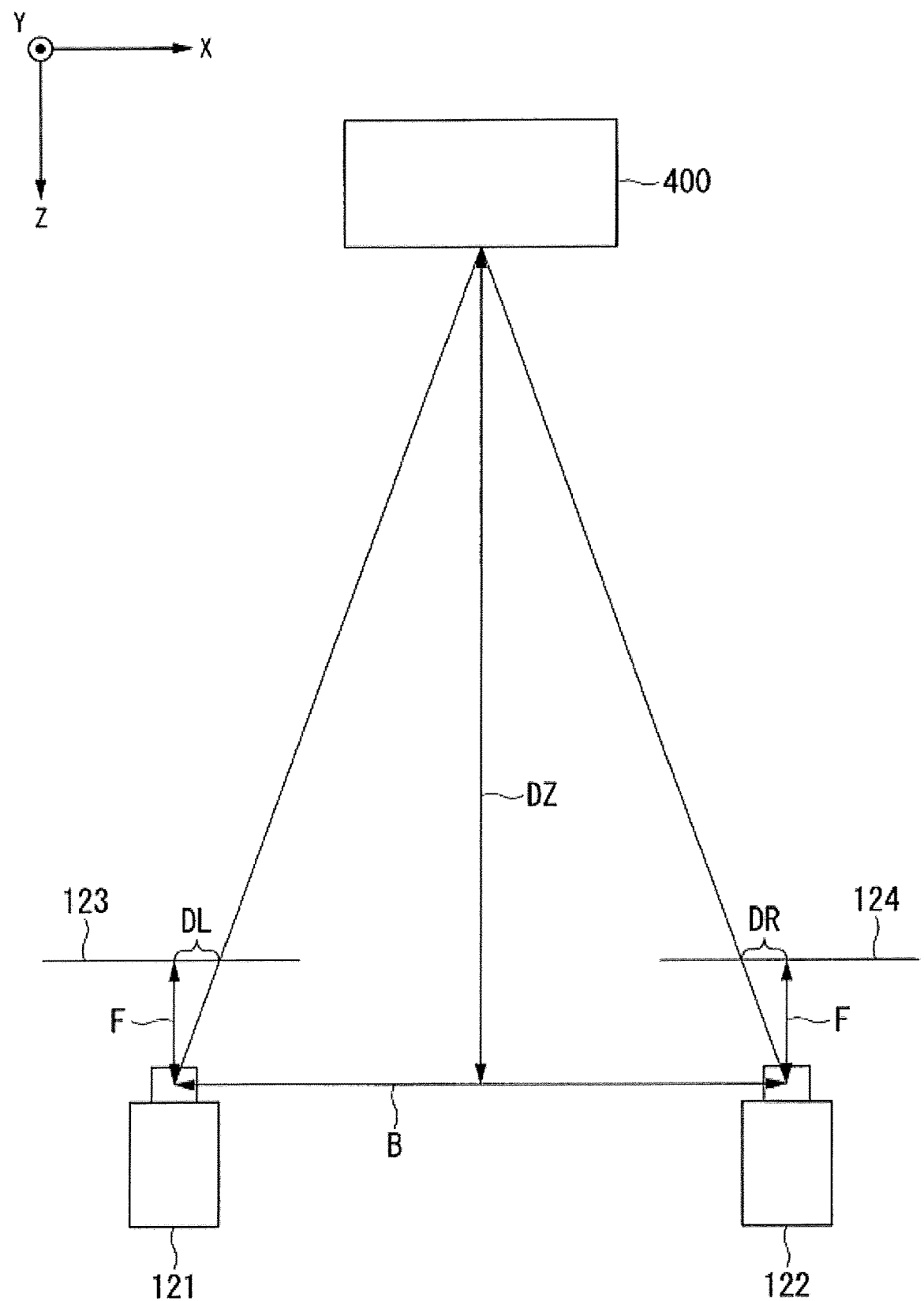
FIG. 2 is a diagram showing an example process of measuring a distance using a second image acquisition unit 120 in accordance with the first embodiment.

FIG. 2 is a diagram showing an example process of measuring a distance using the second image acquisition unit 120 in accordance with the first embodiment. The second image acquisition unit 120 is, for example, a stereo camera, which captures a plurality of images from different viewpoints. The second image acquisition unit 120 is used to generate a distance image of the package 400. The second image acquisition unit 120 includes a first camera 121 and a second camera 122. The first camera 121 captures a left image. The second camera 122 captures a right image.

In FIGS. 1 and 2, the Y-axis is an axis extending in a direction that the package 400 is transported. The Z-axis is an axis extending in a height direction of the package 400. The X-axis is an axis extending in a direction that is perpendicular to the Y-direction and the Z-direction. A position in the Z-axis direction of a line connecting the first camera 121 and the second camera 122 is hereinafter referred to as a "reference position."

In FIG. 2, a left image surface 123 and a right image surface 124 are shown. Here, a distance (baseline length)

between the first camera 121 and the second camera 122 is represented by B, a focal length is represented by F, a distance between the reference position and the package 400 is represented by DZ, a difference between a position of the package 400 in the left image and a center of the left image is represented by DL, and a difference between a position of the package 400 in the right image and a center of the right image is represented by DR.

In this case, the disparity $d=DL-DR$, and the distance $DZ=F\times B/d$. The focal length F is determined by a lens used in the first camera 121 and the second camera 122. The distance B is determined by a position of the first camera 121 and a position of the second camera 122. The disparity d is calculated by performing template matching on the left image and the right image.

The second image acquisition unit 120 sends the acquired right and left images to the image processing apparatus 200. The image processing apparatus 200 can generate a distance image of the package 400 by calculating the distance DZ for each pixel on the basis of the right and left images received from the second image acquisition unit 120. The distance image has a luminance value that increases (or decreases) with an increase in distance, for example. The image acquisition apparatus 100 sends the generated distance image to the image processing apparatus 200.

The image processing apparatus 200 recognizes address information (object information) written in a shipping label region (a region where the object information is present) 410 of the package 400, on the basis of the image of the package 400 and the generated distance image received from the image acquisition apparatus 100. The image processing apparatus 200 sends the recognition result (address information) to the sorting apparatus 300. The address information includes, for example, a postal code written in numerals, an address written in characters, numerals, and symbols, or a combination thereof.

The sorting apparatus 300 includes, for example, a plurality of sorting pockets (not shown) arranged in a plurality of separate stages and a plurality of separate rows, and a VCS pocket (not shown). The sorting apparatus 300 switches sorting destinations of packages 400 transported on the conveyor belt 310, depending on the recognition result (address information) received from the image processing apparatus 200, so that the packages 400 are accumulated in their sorting destinations, i.e., sorting pockets.

When the image processing apparatus 200 has failed to recognize the address information written in the shipping label region 410, the image processing apparatus 200 sends, to the sorting apparatus 300, a notification indicating the failure to recognize the address information. When the sorting apparatus 300 has received the notification indicating the failure to recognize the address information from the image processing apparatus 200, the sorting apparatus 300 switches the sorting destination of the package 400 to the VCS pocket.

Also, when the image processing apparatus 200 has failed to recognize the address information written in the shipping label region 410, the image processing apparatus 200 sends the image data of the package 400 and a video coding (VC) request to the VCS 500 through the network NW.

The VCS 500 is a system that displays the image of the package 400 the address information of which has not been successfully recognized by the image processing apparatus 200, and assists recognizing the address information by visibility of an operator. The VCS 500 includes a plurality of terminals. Each terminal displays the image of the package 400 on a display device, and receives address information that is input by an operator through an input device, such as a keyboard or a touch panel.

When the VCS 500 has received address information input by an operator, the VCS 500 sends the input address information to the image processing apparatus 200 through the network NW. The address information is used when the package 400 which is accumulated in the VCS pocket is processed again. As a result, the package 400 the address information of which has not been successfully recognized by the OCR process is classified into a correct sorting destination by the reprocess.

Although it is assumed above that the image processing apparatus 200 generates the distance image, this is not limiting. For example, the image acquisition apparatus 100 may generate the distance image on the basis of the left and right images acquired by the second image acquisition unit 120, and send the generated distance image to the image processing apparatus 200.

Figure 3:
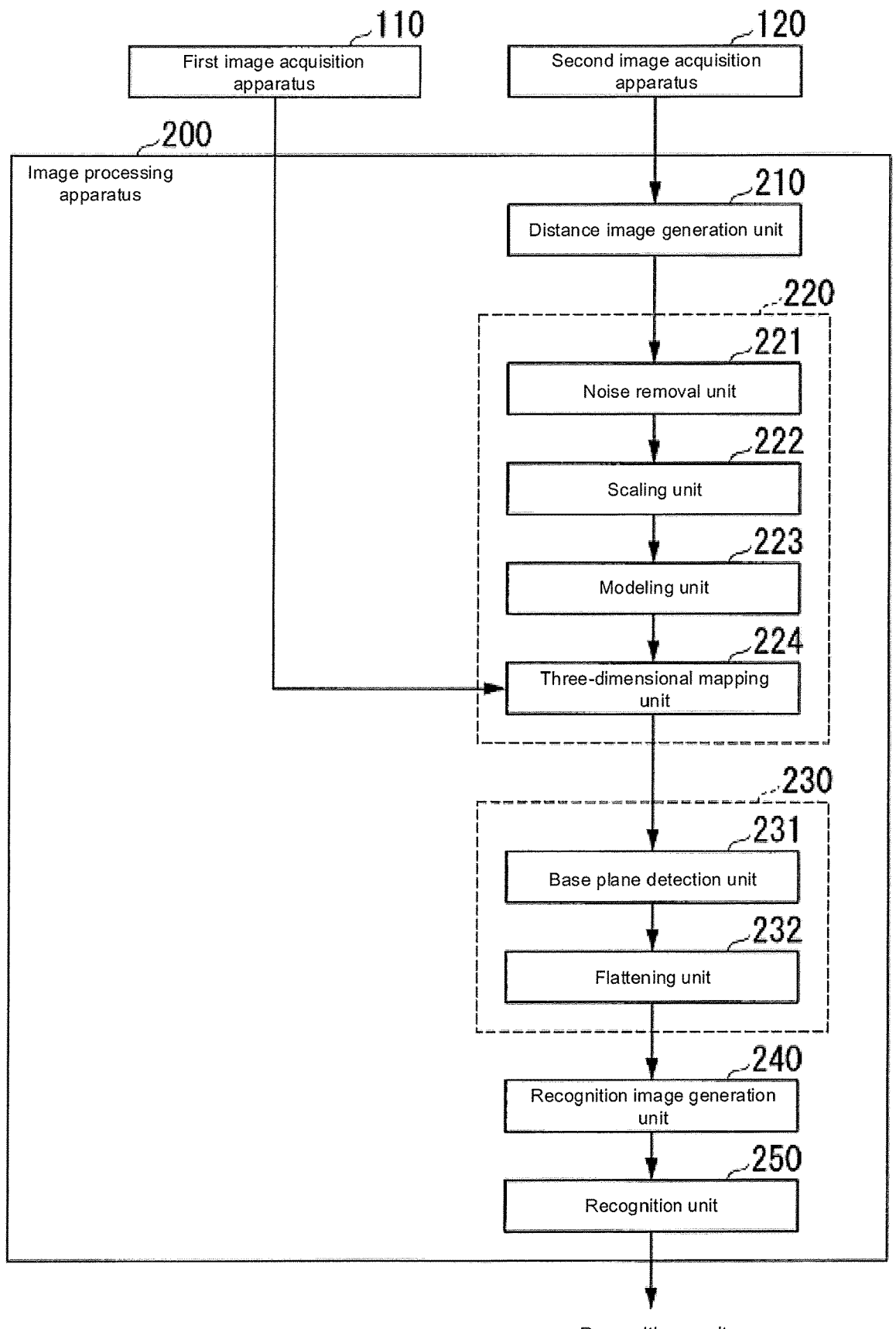
FIG. 3 is a block diagram of an image processing apparatus 200 in accordance with the first embodiment.

FIG. 3 is a block diagram of the image processing apparatus 200 in accordance with the first embodiment. The image processing apparatus 200 includes a distance image generation unit 210, a three-dimensional data generation unit 220, a two-dimensional data generation unit 230, a recognition image generation unit 240, and a recognition unit 250.

The distance image generation unit 210, the three-dimensional data generation unit 220, the two-dimensional data generation unit 230, the recognition image generation unit 240, and the recognition unit 250 are implemented by a program stored in a program memory being executed by a processor, such as a central processing unit (CPU). Note that the distance image generation unit 210, the three-dimensional data generation unit 220, the two-dimensional data generation unit 230, the recognition image generation unit 240, and the recognition unit 250 may be implemented by hardware, such as a large scale integration (LSI), an application specific integrated circuit (ASIC), or a field-programmable gate array (FPGA), that has a function similar to that which is performed by a processor executing a program. In other words, each of the functions of embodiments is implemented by one or more processing circuits. Alternatively, a plurality of functions of embodiments is implemented by one or more processing circuits. A processing circuit includes a programmed processor as a processor including a circuit. A processing circuit includes devices such as an ASIC, and a commonly used circuit element which is provided to perform a function described herein.

As described above, the distance image generation unit 210 calculates the distance DZ for each pixel on the basis of the right and left images received from the second image acquisition unit 120, to generate the distance image of the package 400. The distance image generation unit 210 outputs the generated distance image to the three-dimensional data generation unit 220.

The three-dimensional data generation unit 220 includes a noise removal unit 221, a scaling unit 222, a modeling unit 223, and a three-dimensional mapping unit 224. The two-dimensional data generation unit 230 includes a base plane detection unit 231 and a flattening unit 232.

The distance image generated by the distance image generation unit 210 contains an incorrect value caused by an error in disparity calculation, etc. Therefore, the noise removal unit 221 removes noise from the distance image input from the distance image generation unit 210. For example, the noise removal unit 221 removes noise using a median filter. The noise removal unit 221 outputs the distance image from which noise has been removed, to the scaling unit 222.

The scaling unit 222 adjusts a scale in the Z-direction (the height direction of the package 400) of the distance image from which noise has been removed by the noise removal unit, on the basis of a scale in the X-direction (a transverse direction of the image of the package 400) and a scale in the Y-direction (a longitudinal direction of the image of the package 400). The scaling unit 222 outputs the distance image the scale in the Z-direction of which has been adjusted, to the modeling unit 223.

The modeling unit 223 calculates a coordinate point (x, y, z) in three-dimensional space of each pixel of the package 400, on the basis of the distance image the scale in the Z-direction of which has been adjusted by the scaling unit 222. For example, the modeling unit 223 interpolates coordinate points in incomplete portions of the distance image by performing spline interpolation. The modeling unit 223 outputs a set of calculated coordinate points (a three-dimensional model) in three-dimensional space to the three-dimensional mapping unit 224.

The three-dimensional mapping unit 224 generates three-dimensional data on the basis of the set of coordinate points in three-dimensional space calculated by the modeling unit 223, and the image of the package 400 received from the first image acquisition unit 110. Specifically, the three-dimensional mapping unit 224 associates the coordinate point (x, y, z) in three-dimensional space of each pixel of the package 400 with a luminance value on the basis of the image of the package 400 received from the first image acquisition unit 110, to generate three-dimensional data of the package 400. The three-dimensional mapping unit 224 outputs the generated three-dimensional data to the base plane detection unit 231.

The base plane detection unit 231 detects a base plane that is a reference for a position of the package 400. For example, the base plane is a plane on which the package 400 is placed. For example, the base plane detection unit 231 detects the base plane by executing a random sample consensus (RANSAC) algorithm on the three-dimensional data generated by the three-dimensional mapping unit 224. In the case where the position of the conveyor belt 310 and the position of the second image acquisition unit 120 are fixed, the base plane detection unit 231 may detect the base plane only once. The base plane detection unit 231 outputs data of the detected base plane and the three-dimensional data to the flattening unit 232.

The flattening unit 232 flattens the three-dimensional data generated by the three-dimensional mapping unit 224 with reference to the base plane detected by the base plane detection unit 231, to generate two-dimensional data. Specifically, the flattening unit 232 lowers the coordinate in the Z-direction of each point of the three-dimensional data to the height of the base plane while maintaining the distance between each point. The three-dimensional data is eventually stretched, so that a surface on which the deformed address information (object information) is written is flattened. As a result, the deformation of the address information (object information) is corrected. The flattening unit 232 outputs the generated two-dimensional data to the recognition image generation unit 240.

All of the coordinate points in three-dimensional space are moved to the base plane, and therefore, the number of coordinate points per unit area is sparse in some areas, and dense in others, in the two-dimensional data generated by the flattening unit 232. Therefore, the two-dimensional data generated by the flattening unit 232 should be corrected to generate an image suited to recognition of the address information (object information).

Therefore, the recognition image generation unit 240 generates a recognition image that is used to recognize the address information (object information) on the basis of the two-dimensional data generated by the flattening unit 232. Specifically, the recognition image generation unit 240 calculates the luminance of each pixel indicated by a two-dimensional grid point, to generate the recognition image.

The recognition image generation unit 240 may also perform a super-resolution imaging process on the two-dimensional data generated by the flattening unit 232 in order to enhance the resolution of the two-dimensional data. For example, the recognition image generation unit 240 may perform, on the two-dimensional data, a super-resolution imaging process of producing an initial image by nearest neighbor search, and using self-similarity. As a result, the recognition rate of the address information can be improved.

The recognition unit 250 performs a recognition process on a binarized image. Therefore, the recognition image generation unit 240 performs a super-resolution imaging process on the two-dimensional data to generate a binarized image having a super resolution as a recognition image. The recognition image generation unit 240 outputs the generated recognition image to the recognition unit 250.

The recognition unit 250 performs an OCR process on the recognition image generated by the recognition image generation unit 240. When the recognition unit 250 has successfully detected character information in the shipping label region 410, the recognition unit 250 can successfully recognize the address information. Meanwhile, when the recognition unit 250 has failed to detect character information in the shipping label region 410, the recognition unit 250 cannot successfully recognize the address information.

When the recognition unit 250 has successfully recognized the address information, the recognition unit 250 sends the recognized address information to the sorting apparatus 300. Meanwhile, when the recognition unit 250 has failed to recognize the address information, the recognition unit 250 sends a VC request and the recognition image to the VCS 500 through the network NW.

When the VCS 500 has received the VC request from the recognition unit 250, the VCS 500 displays the recognition image received from the recognition unit 250 on a display device. When an operator has input address information to the VCS 500, the VCS 500 sends the input address information to the recognition unit 250 through the network NW. The recognition unit 250 sends the address information received from the VCS 500 to the sorting apparatus 300. As a result, the package 400 the address information of which has not been successfully recognized by the recognition unit 250 is classified into a correct sorting destination.

Figure 4:
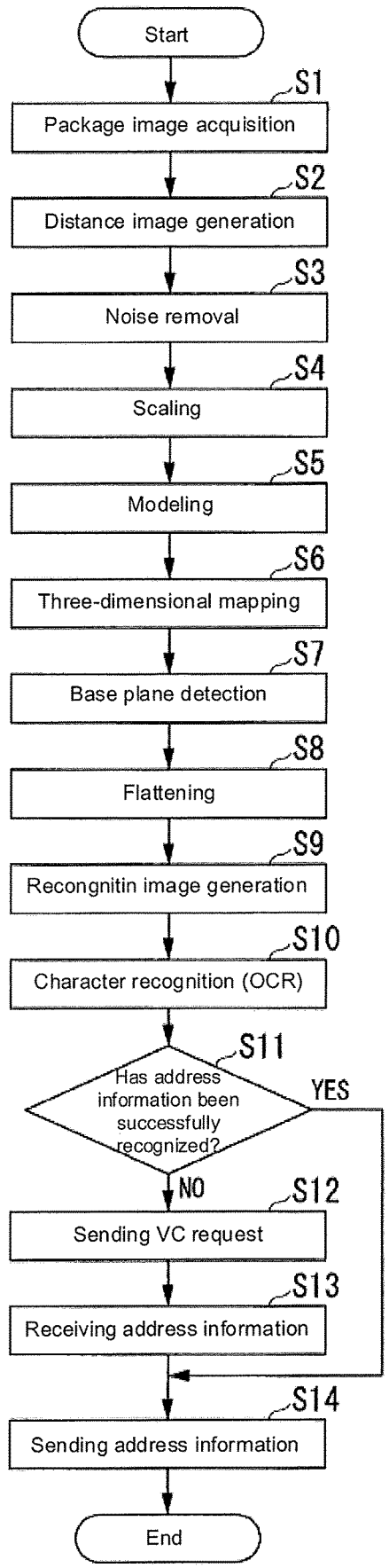
FIG. 4 is a flowchart showing a process of the image processing apparatus 200 in accordance with the first embodiment.

FIG. 4 is a flowchart showing a process of the image processing apparatus 200 in accordance with the first embodiment. A program for executing the flowchart is stored in a program memory of the image processing apparatus 200.

Initially, the image processing apparatus 200 acquires an image of the package 400 from the first image acquisition unit 110 (step S1). The distance image generation unit 210 generates a distance image on the basis of a plurality of images received from the second image acquisition unit 120 (step S2). Next, the noise removal unit 221 removes noise from the distance image (step S3). The scaling unit 222 adjusts the scale in the Z-direction of the distance image from which noise has been removed by the noise removal unit 221, on the basis of the scale in the X-direction and the scale in the Y-direction (step S4).

The modeling unit 223 calculates the coordinate point in three-dimensional space of each pixel of the package 400, on the basis of the distance image the scale in the Z-direction of which has been adjusted by the scaling unit 222 (step S5). The three-dimensional mapping unit 224 generates three-dimensional data on the basis of the set of coordinate points in three-dimensional space calculated by the modeling unit 223, and the image of the package 400 acquired by the first image acquisition unit 110 (step S6).

The base plane detection unit 231 detects a base plane that serves as a reference for a position of the package 400 (step S7). The flattening unit 232 flattens the three-dimensional data generated by the three-dimensional mapping unit 224 with reference to the base plane detected by the base plane detection unit 231, to generate two-dimensional data (step S8).

The recognition image generation unit 240 generates a recognition image that is used to recognize the address information, on the basis of the two-dimensional data generated by the flattening unit 232 (step S9). The recognition unit 250 performs an OCR process on the recognition image generated by the recognition image generation unit 240 (step S10).

Next, the recognition unit 250 determines whether or not the address information has been successfully recognized (step S11). When the recognition unit 250 determines that the address information has been successfully recognized, the recognition unit 250 shifts processing to step S14 described below. Meanwhile, when the recognition unit 250 determines that the address information has not been successfully recognized, the recognition unit 250 sends a VC request and the recognition image to the VCS 500 through the network NW (step S12). Thereafter, the recognition unit 250 receives address information from the VCS 500 through the network NW (step S13).

The recognition unit 250 sends the address information successfully recognized in step S11 or the address information received in step S13, to the sorting apparatus 300 (step S14). As a result, the package 400 the address information of which has not been successfully recognized by the recognition unit 250 is classified into a correct sorting destination.

As described above, the image processing apparatus 200 of the first embodiment has the three-dimensional data generation unit 220, the two-dimensional data generation unit 230, and the recognition image generation unit 240. The three-dimensional data generation unit 220 generates three-dimensional data of the package 400 on the basis of an image and a distance image of the package 400. The two-dimensional data generation unit 230 flattens the three-dimensional data generated by the three-dimensional data generation unit 220 to generate two-dimensional data. The recognition image generation unit 240 generates a recognition image that is used to recognize address information, on the basis of the two-dimensional data generated by the two-dimensional data generation unit 230. As a result, the image processing apparatus 200 of the first embodiment can improve the recognition rate of address information attached to the package 400.

Second Embodiment

Next, a second embodiment will be described. When the packaging material of the package 400 is a glossy material, such as a plastic, the light of the illumination device is specularly reflected by the surface of the packaging material, and therefore, clipping (saturation of the luminance value) occurs in the image of the package 400 acquired by the first image acquisition unit 110. If clipping occurs in the image of the package 400, the address information (object information) may not be successfully recognized. Therefore, an image processing apparatus 200 in accordance with the second embodiment detects a region around the address information where light is reflected, and reduces the reflection of light in two-dimensional data by image processing. As a result, the recognition rate of the address information can be improved. The second embodiment will now be described in greater detail.

Figure 5:
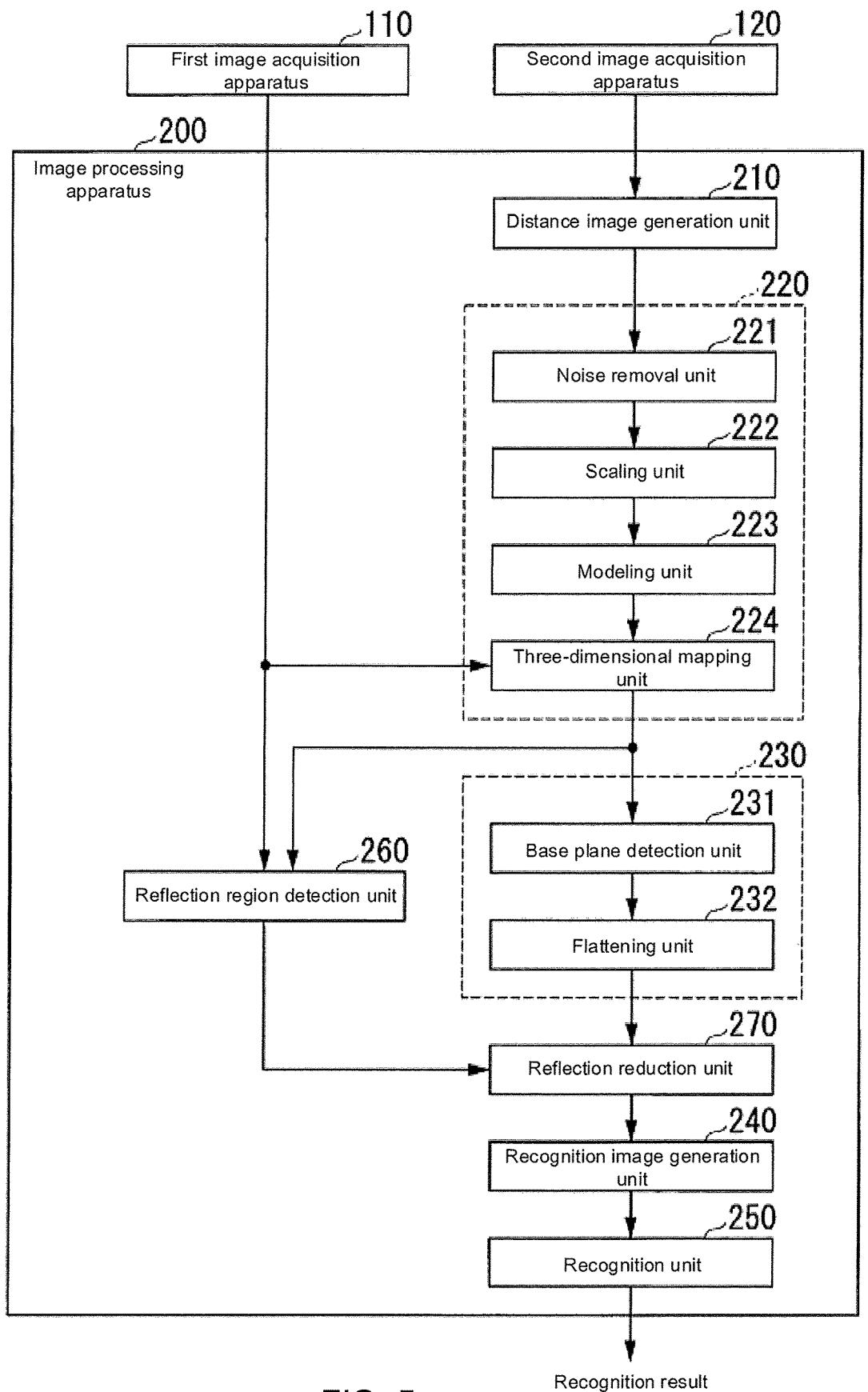
FIG. 5 is a block diagram of an image processing apparatus 200 in accordance with a second embodiment.

FIG. 5 is a block diagram of the image processing apparatus 200 in accordance with the second embodiment. In FIG. 5, parts corresponding to those of FIG. 3 are designated by the same reference numerals and will not be described. The image processing apparatus 200 includes, in addition to the distance image generation unit 210, the three-dimensional data generation unit 220, the two-dimensional data generation unit 230, the recognition image generation unit 240, and the recognition unit 250, a reflection region detection unit 260, and a reflection reduction unit 270.

When specular reflection occurs on the address information (object information), the address information cannot be reproduced, and therefore, the recognition unit 250 sends a VC request to the VCS 500. Meanwhile, when specular reflection (clipping) occurs in an image around the address information, the recognition unit 250 is likely to falsely recognize an area (edge) where there is a sharp change in luminance due to the specular reflection, as a portion of a character. In this case, the reflection reduction unit 270 performs a process of reducing specular reflection, in order to improve the recognition rate of the address information.

When the reflection reduction unit 270 performs the specular reflection reduction process on a region where the address information is written, the recognition rate of the address information undesirably decreases. Therefore, the reflection region detection unit 260 excludes a region having a high luminance of a surface facing vertically upward (the Z-direction) where the address information is highly likely to be written, from a region on which the reflection reduction process is to be performed, on the basis of the three-dimensional data of the package 400 generated by the three-dimensional mapping unit 224.

The reflection region detection unit 260 determines whether or not a surface faces vertically upward (the Z-direction), using a normal vector of the surface. The reflection region detection unit 260 identifies a region having a high luminance of a surface other than the surface facing vertically upward (the Z-direction) as a specular reflection region. As a result, the reflection region detection unit 260 can distinguish a blank portion of a region where the address information is written, from a portion in which clipping occurs due to specular reflection, on the basis of the three-dimensional data of the package 400.

As shown in FIG. 5, the first image acquisition unit 110 outputs an image of the package 400 to the reflection region detection unit 260. The three-dimensional mapping unit 224 outputs three-dimensional data to the reflection region detection unit 260. The reflection region detection unit 260 detects a region where light is reflected around the address information, in the image of the package 400. Specifically, the reflection region detection unit 260 detects a region having a saturated luminance value in the image of the package 400 input from the first image acquisition unit 110, as a specular reflection region.

The reflection region detection unit 260 also excludes a region having a high luminance of a surface facing vertically upward (the Z-direction), from the specular reflection region, on the basis of the three-dimensional data of the package 400 input from the three-dimensional mapping unit 224. The reflection region detection unit 260 outputs the detected specular reflection region to the reflection reduction unit 270.

The reflection reduction unit 270 reduces light reflection in the two-dimensional data generated by the flattening unit 232, by image processing, on the basis of the specular reflection region detected by the reflection region detection unit 260. For example, the reflection reduction unit 270 executes an existing algorithm such as inpainting to perform the reflection reduction process on the specular reflection region. In inpainting, the reflection reduction unit 270 fills "holes" using surrounding pixels (this process may be referred to as "hole-filling"), to reduce light reflection in the specular reflection region detected by the reflection region detection unit 260. The reflection reduction unit 270 may give higher priority to filling "holes" in order to prevent a new edge (an area where there is a sharp change in luminance) from occurring than that to filling "holes" in order to eliminate unnaturalness.

The reflection reduction unit 270 outputs the two-dimensional data on which the reflection reduction process has been performed, to the recognition image generation unit 240. The subsequent steps are similar to those of the first embodiment and will not be described.

Figure 6:
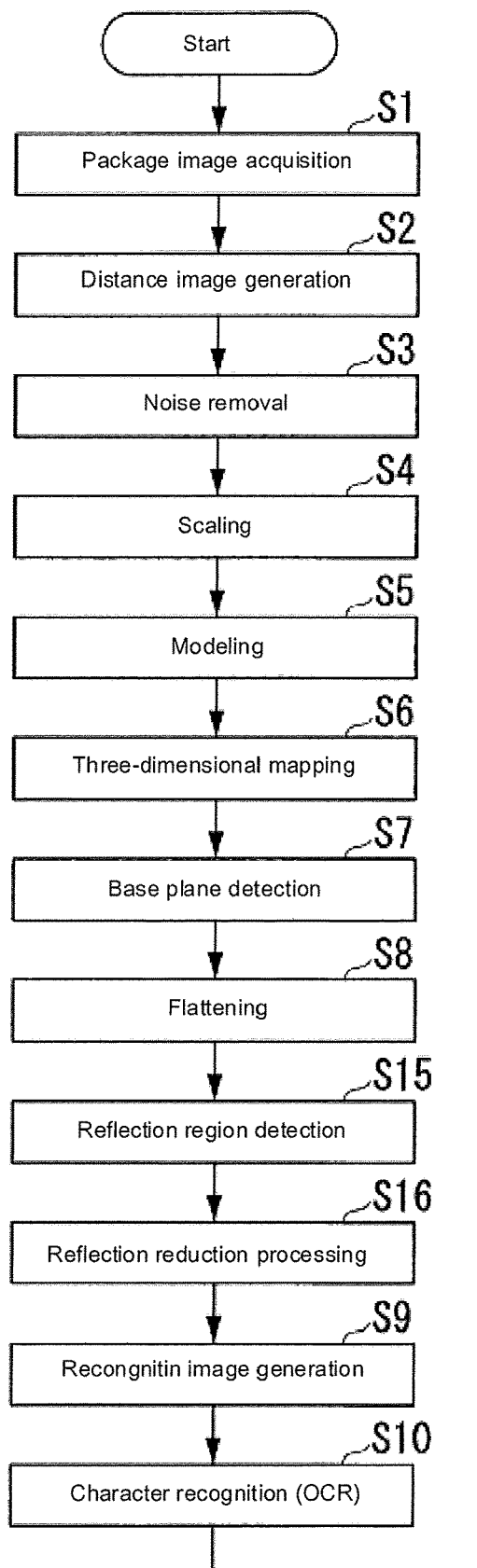
FIG. 6 is a flowchart showing a process of the image processing apparatus 200 in accordance with the second embodiment.
Figure 6:
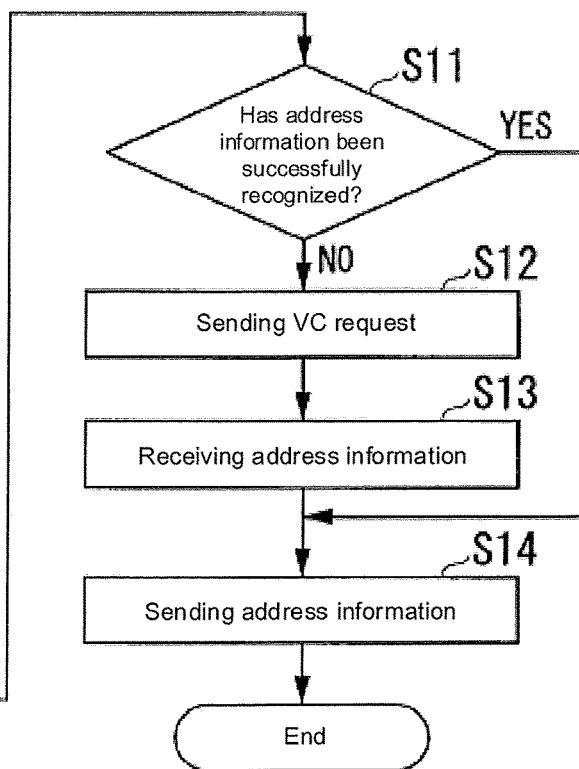

FIG. 6 is a flowchart showing a process of the image processing apparatus 200 in accordance with the second embodiment. A program for executing the flowchart is stored in a program memory of the image processing apparatus 200.

Initially, the image processing apparatus 200 acquires an image of the package 400 from the first image acquisition unit 110 (step S1). The distance image generation unit 210 generates a distance image on the basis of a plurality of sub-images received from the second image acquisition unit 120 (step S2). Next, the noise removal unit 221 removes noise from the distance image (step S3). The scaling unit 222 adjusts the scale in the Z-direction of the distance image from which noise has been removed by the noise removal unit 221, on the basis of the scale in the X-direction and the scale in the Y-direction (step S4).

The modeling unit 223 calculates the coordinate point in three-dimensional space of each pixel of the package 400, on the basis of the distance image the scale in the Z-direction of which has been adjusted by the scaling unit 222 (step S5). The three-dimensional mapping unit 224 generates three-dimensional data on the basis of the set of coordinate points in three-dimensional space calculated by the modeling unit 223, and the image of the package 400 acquired by the image acquisition apparatus 100 (step S6).

The base plane detection unit 231 detects a base plane that serves as a reference for a position of the package 400 (step S7). The flattening unit 232 flattens the three-dimensional data generated by the three-dimensional mapping unit 224 with reference to the base plane detected by the base plane detection unit 231, to generate two-dimensional data (step S8).

The reflection region detection unit 260 detects a specular reflection region where light is reflected around the address information, in the image of the package 400 acquired from the image acquisition apparatus 100 (step S15). The reflection reduction unit 270 reduces light reflection in the two-dimensional data generated by the flattening unit 232, by image processing, on the basis of the specular reflection region detected by the reflection region detection unit 260 (step S16).

The recognition image generation unit 240 generates a recognition image that is used to recognize the address information, on the basis of the two-dimensional data on which the reflection reduction process has been performed by the reflection reduction unit 270 (step S9). The recognition unit 250 performs an OCR process on the recognition image generated by the recognition image generation unit 240 (step S10). The subsequent steps are similar to those of the first embodiment and will not be described.

As described above, the image processing apparatus 200 of the second embodiment has the reflection region detection unit 260 and the reflection reduction unit 270. The reflection region detection unit 260 detects a specular reflection region where light is reflected around the address information, in the image of the package 400. The reflection reduction unit 270 reduces light reflection in the two-dimensional data generated by the flattening unit 232, by image processing, on the basis of the specular reflection region detected by the reflection region detection unit 260. As a result, the image processing apparatus 200 of the second embodiment can have a further improved recognition rate of address information attached to the package 400.

Third Embodiment

Next, a third embodiment will be described. In the first and second embodiments, the second image acquisition unit 120 is a stereo camera, which acquires a plurality of images from different viewpoints. In contrast to this, in the third embodiment, the second image acquisition unit 120 is a light-field camera. The third embodiment will now be described in detail.

The second image acquisition unit (light-field camera) 120 captures an image of the package 400 as it is being moved by the conveyor belt 310. The second image acquisition unit 120 acquires not only position information of light rays that are reflected by the package 400 and reach the second image acquisition unit 120, but also information about directions that the light rays travel. By performing a predetermined process on the image data (light-field data) acquired by the second image acquisition unit 120, an image can be reconstructed such that a focus is set at an arbitrary position, or a viewpoint is changed. The second image acquisition unit 120 is hereinafter referred to as the light-field camera 120.

Figure 7:
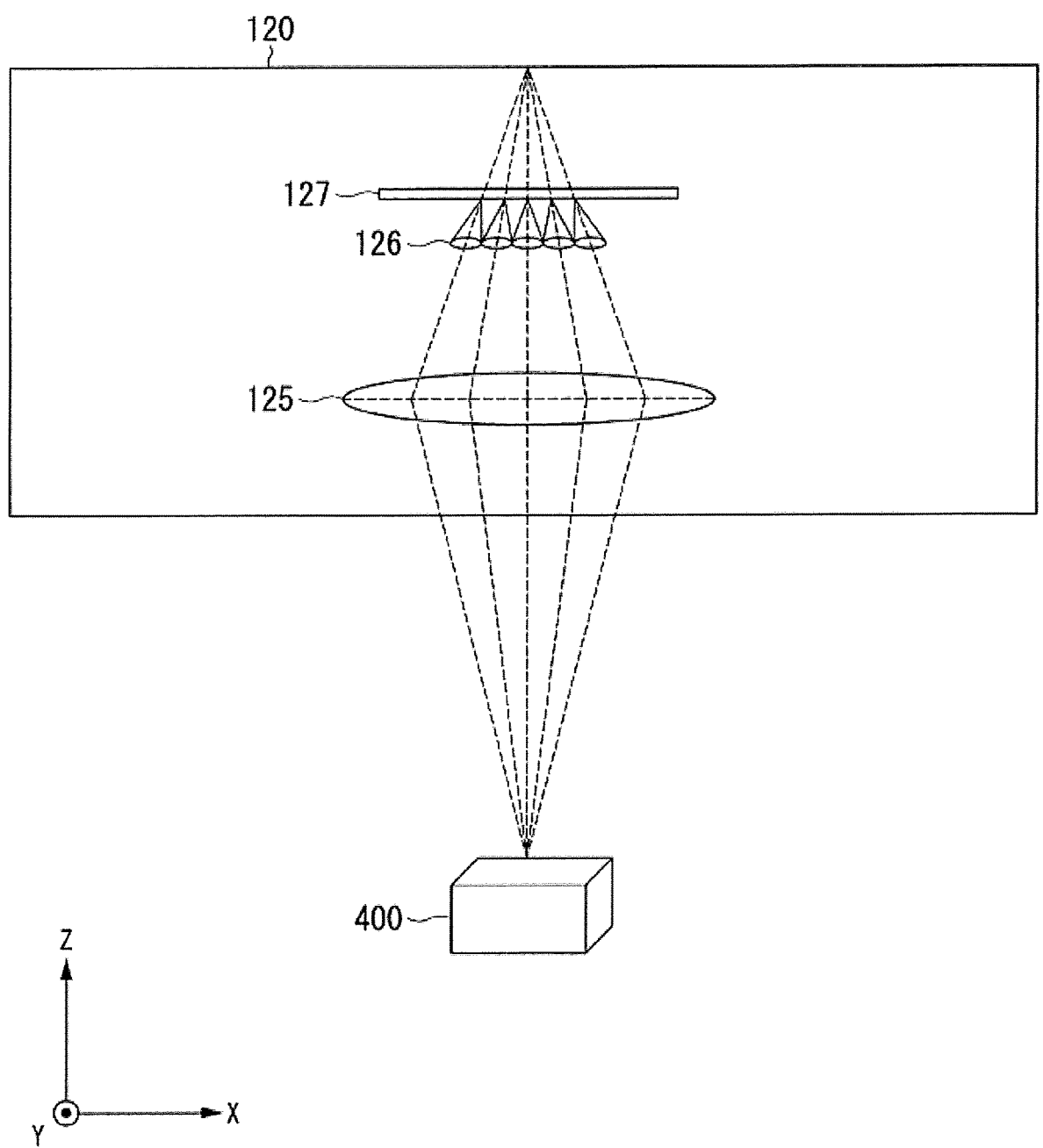
FIG. 7 is a diagram showing a detailed configuration of a light-field camera 120 in accordance with a third embodiment.

FIG. 7 is a diagram showing a detailed configuration of the light-field camera 120 in accordance with the third embodiment. In FIG. 7, the Y-axis is an axis extending in a direction that the package 400 is transported, the Z-axis is an axis extending in a height direction of the package 400, and the X-axis is an axis extending in a direction perpendicular to the Y-direction and the Z-direction.

The light-field camera 120 includes a main lens 125, a microlens array 126, and an image sensor 127. The main lens 125 receives light from an object (the package 400). The microlens array 126 is a lens array including a plurality of microlenses. The image sensor 127, which is an image capture device having a plurality of pixels, detects the intensity of light at each pixel. The image sensor 127 is, for example, a CCD sensor, a CMOS sensor, etc.

Although the light-field camera 120 of FIG. 7 is of the compound eye type, this is not limiting. For example, a similar effect is obtained by light-field cameras of other types, such as the multiple eye type. Although the light-field camera 120 of this embodiment is a virtual image optical system, this is not limiting. For example, a similar effect is obtained by a real image optical system.

Figure 8:
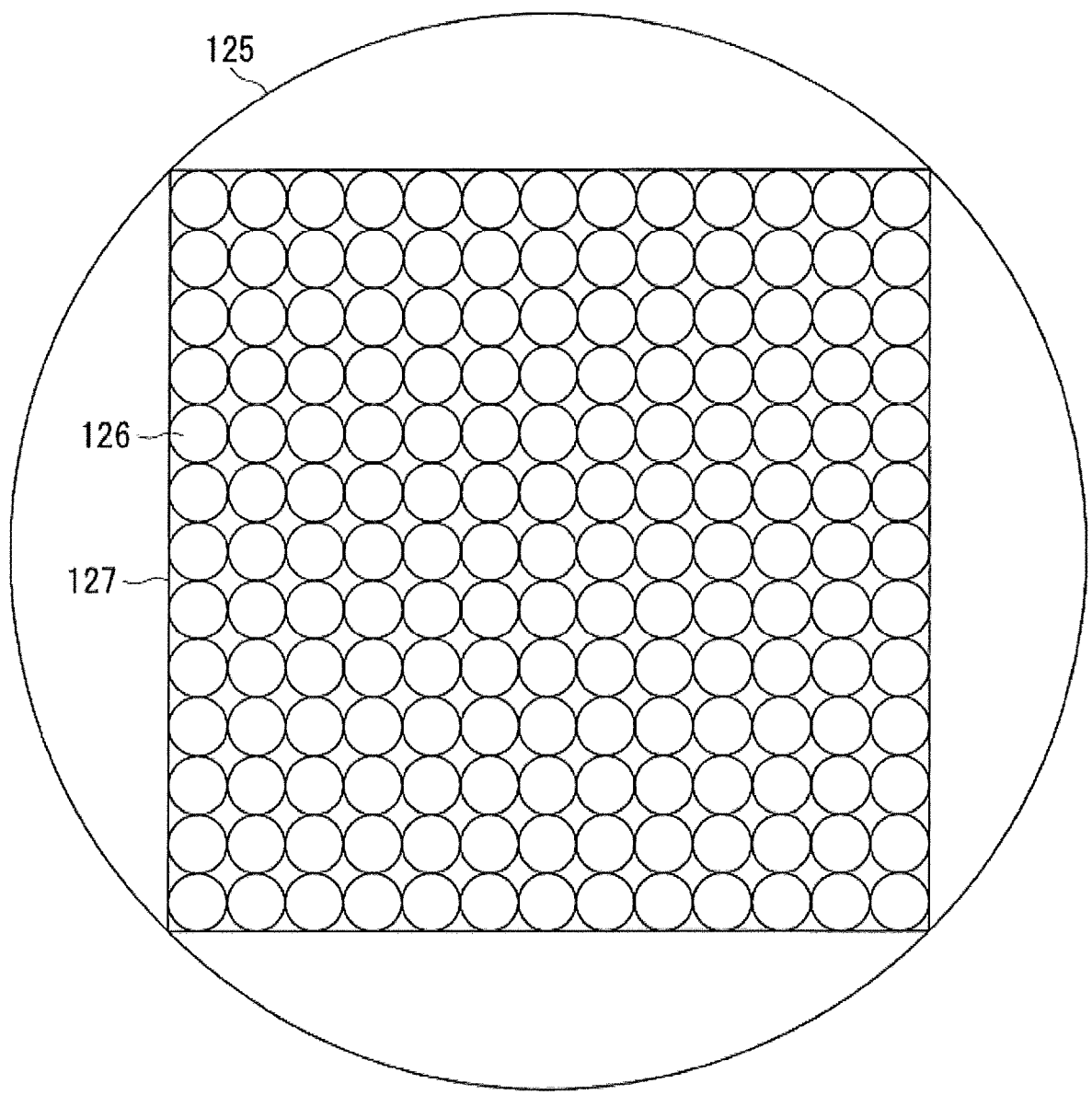
FIG. 8 is a diagram showing a structure of a microlens array 126 in accordance with the third embodiment.

FIG. 8 is a diagram showing a structure of the microlens array 126 in accordance with the third embodiment. As shown in FIG. 8, the microlens array 126 is a lens array of microlenses arranged in a matrix. Light rays input through the main lens 125 are separated by the microlens array 126 according to the directions of the light rays. Although the microlens array 126 of FIG. 8 has 13×13 microlenses, this is not limiting.

Although, in this embodiment, the microlens has a circular shape as viewed along the optical axis, this is not limiting. For example, the microlens may be polygonal (e.g., quadrangular).

Figure 9:
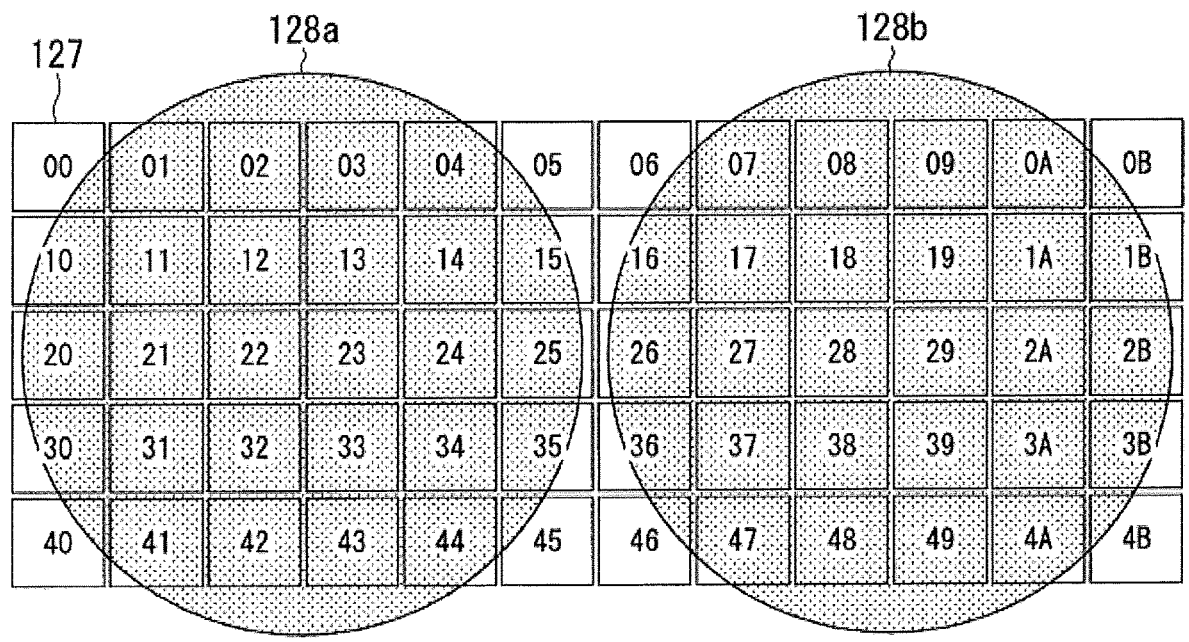
FIG. 9 is a diagram showing a relationship between the microlens array 126 and an image sensor 127 in accordance with the third embodiment.

FIG. 9 is a diagram showing a relationship between the microlens array 126 and the image sensor 127 in accordance with the third embodiment. As shown in FIG. 9, light rays separated by the microlens array 126 are projected onto the image sensor 127 to form circular sub-images 128a and 128b. Although the two sub-images 128a and 128b are shown here for the sake of simplicity, a plurality of sub-images corresponding to a plurality of microlenses are actually projected onto the image sensor 127.

When the sub-images projected from the microlens array 126 are received by a plurality of pixels of the image sensor 127, the intensity of a light ray can be detected for each incident direction. Image data (light-field data) detected by the image sensor 127 is a set of sub-images formed by the respective microlenses.

The light-field camera 120 sends the acquired light-field data to the image processing apparatus 200. The distance image generation unit 210 of the image processing apparatus 200 generates a distance image on the basis of the light-field data received from the light-field camera 120. A method for generating the distance image will now be described.

The distance image generation unit 210 calculates a distance between the light-field camera 120 and an object, for each sub-image obtained through a microlens, on the basis of the light-field data. As a result, the distance image generation unit 210 can generate a distance image. In the distance image, for example, the greater the distance, the higher (or lower) the luminance value. The distance image generation unit 210 performs template matching on a plurality of adjacent sub-images to calculate a disparity, and on the basis of the calculated disparity, calculates a distance using a stereo image processing algorithm.

Figure 10:
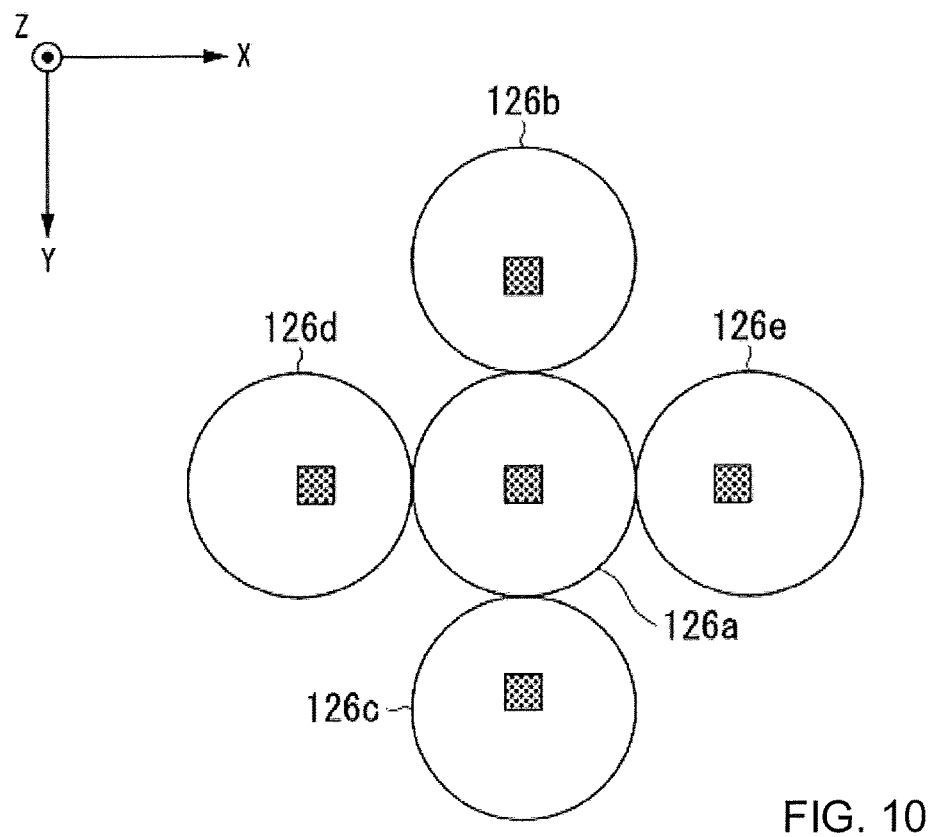
FIG. 10 is a diagram for describing disparity calculation in accordance with the third embodiment.

FIG. 10 is a diagram for describing the disparity calculation in accordance with the third embodiment. A central microlens 126a is adjacent to microlenses 126b and 126c in the Y-direction. The central microlens 126a is also adjacent to microlenses 126d and 126e in the X-direction.

The process of calculating a distance between the light-field camera 120 and an object with respect to a sub-image that is obtained through the central microlens 126a, will be specifically described. The distance image generation unit 210 performs template matching on the sub-image that is obtained through the central microlens 126a, and each of four sub-images that are obtained through the four microlenses 126b to 126e, to calculate four disparities.

Specifically, the distance image generation unit 210 calculates a disparity D1 on the basis of the sub-image that is obtained through the microlens 126a and the sub-image that is obtained through the microlens 126b. The distance image generation unit 210 also calculates a disparity D2 on the basis of the sub-image that is obtained through the microlens 126a and the sub-image that is obtained through the microlens 126c. The distance image generation unit 210 also calculates a disparity D3 on the basis of the sub-image that is obtained through the microlens 126a and the sub-image that is obtained through the microlens 126d. The distance image generation unit 210 also calculates a disparity D4 on the basis of the sub-image that is obtained through the microlens 126a and the sub-image that is obtained through the microlens 126e.

Next, the distance image generation unit 210 calculates the distance to the object with respect to the sub-image that is obtained through the central microlens 126a, using a stereo image processing algorithm, on the basis of an average value Dave of the four disparities D1 to D4. The distance image generation unit 210 performs the above process for all microlenses, to generate a distance image. The distance image generation unit 210 outputs the generated distance image to the noise removal unit 221.

Although it is assumed that the distance image generation unit 210 calculates the distance using the average value Dave, this is not limiting. For example, the distance image generation unit 210 may select a disparity that can be presumed to be the best, from the four disparities D1 to D4, on the basis of the reliability of the result of template matching, and calculate the distance to the object with respect to the sub-image that is obtained through the central microlens 126a, using a stereo image processing algorithm, on the basis of the selected disparity.

As described above, the distance image generation unit 210 of the third embodiment may generate a distance image on the basis of the image data (light-field data) of the package 400 acquired by the light-field camera 120. As a result, also in the third embodiment, the recognition rate of the address information attached to the package 400 can be improved.

Note that the modeling unit 223 may weight distance information contained in the distance image on the basis of the reliability with which the distance image has been acquired (the reliability of the result of template matching), to generate the three-dimensional data. As a result, the modeling unit 223 can generate the three-dimensional data with higher accuracy.

Fourth Embodiment

Next, a fourth embodiment will be described. In the third embodiment, the light-field camera 120 is used as an area sensor. In contrast to this, in the fourth embodiment, the light-field camera 120 is used as a line sensor. As a result, the configuration of the light-field camera 120 can be simplified. The fourth embodiment will now be described in detail.

Figure 11:
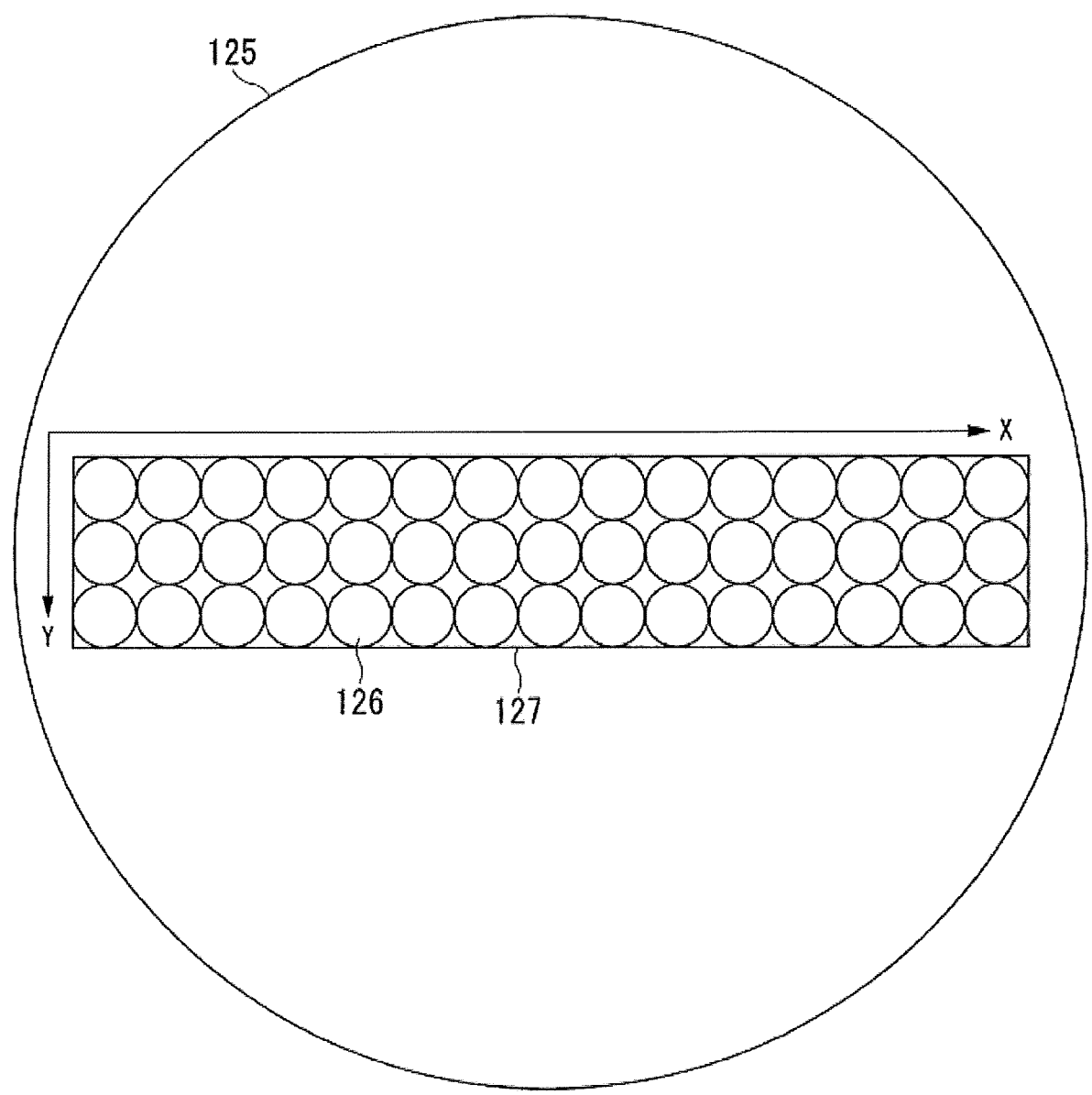
FIG. 11 is a diagram showing a structure of a microlens array 126 in accordance with a fourth embodiment.

FIG. 11 is a diagram showing a structure of a microlens array 126 in accordance with the fourth embodiment. As shown in FIG. 11, the microlens array 126 is a lens array of microlenses arranged in a matrix. Light rays input through a main lens 125 are separated by the microlens array 126 according to the directions of the light rays.

The microlens array 126 is longer in the X-direction (longitudinal direction) than in the Y-direction (transverse direction). Here, the Y-direction is a direction in which the package 400 is moved by the conveyor belt 310, and the X-direction is perpendicular to the Y-direction. Although the microlens array 126 shown in FIG. 11 has 45 microlenses (3 rows×15 columns), this is not limiting.

While the package 400 is being moved in the Y-direction relative to the light-field camera 120, an image of the package 400 is captured by the light-field camera 120. Light-field data acquired by the light-field camera 120, which is a set of micro-images obtained through the microlenses, includes more pixels in the X-direction than in the Y-direction.

The light-field camera 120 outputs a one-dimensional set of pixel values when shooting is performed once. The light-field camera 120 performs successive shooting to acquire a two-dimensional image of the package 400 as it is being transported at a constant speed by the conveyor belt 310. Therefore, as shown in FIG. 11, the microlens array 126 and the image sensor 127 are disposed only within a range necessary for obtaining a line of image.

The light-field camera 120 is disposed such that the longitudinal direction (the X-direction) of the light-field camera 120 is perpendicular to the movement direction (the Y-direction) of the package 400. Although, in this embodiment, the microlens has a circular shape as viewed along the optical axis, this is not limiting. For example, the microlens may be polygonal (e.g., quadrangular). Instead of using the light-field camera 120 of this embodiment, a conventional light-field camera may be employed, and only a portion of the output thereof may be used.

When the light-field camera 120 of this embodiment is used, the area that is illuminated by the illumination devices 130 and 140 can be limited to a linear area. The illumination devices 130 and 140 do not need to illuminate a large area, and therefore, the size and cost of the illumination devices 130 and 140 can be reduced. In addition, even when packages 400 are continuously transported, overlapping each other, or when a package 400 has an elongated shape in the movement direction, the light-field camera 120 can capture an image of each entire package 400. Note that a lens may be provided between the illumination devices 130 and 140 and the package 400 in order to concentrate light to the linear area.

As described above, the distance image generation unit 210 of the fourth embodiment generates a distance image on the basis of the image data (light-field data) of the package 400 acquired by the light-field camera 120 that is used as a line sensor. As a result, in the fourth embodiment, the size and cost of the illumination device can be reduced, and a distance image can be generated irrespective of the shape of the package 400.

Although it is assumed in the first to fourth embodiments that the position of the image acquisition apparatus 100 is fixed, and the package 400 is passed through an image capture position of the image acquisition apparatus 100, this is not limiting. For example, the position of the package 400 may be fixed, and the image acquisition apparatus 100 may be moved to capture an image of the package 400. Alternatively, both the image acquisition apparatus 100 and the package 400 may be moved such that the image acquisition apparatus 100 captures an image of the object.

Fifth Embodiment

Although, in the first to fourth embodiments, address information attached to the shipping label region 410 is recognized, the object to be recognized is not limited to this. For example, in a fifth embodiment, the recognition unit 250 performs a recognition process on a vehicle registration plate of a vehicle that is traveling on a road. The recognition unit 250 in accordance with any one of the first to fourth embodiments may be applied to the recognition process of a vehicle registration plate. The fifth embodiment will now be described in detail.

In the fifth embodiment, the image acquisition apparatus 100 is disposed, at the side of a road. The first image acquisition unit 110 and the second image acquisition unit 120 capture images of a vehicle registration plate of a vehicle. The distance image generation unit 210 generates a distance image on the basis of the images of the vehicle registration plate acquired by the second image acquisition unit 120.

The three-dimensional data generation unit 220 generates three-dimensional data of the vehicle registration plate on the basis of the image of the vehicle registration plate acquired by the first image acquisition unit 110 and the distance image generated by the distance image generation unit 210. The two-dimensional data generation unit 230 flattens the three-dimensional data generated by the three-dimensional data generation unit 220 to generate two-dimensional data.

The recognition image generation unit 240 generates a recognition image that is used to recognize the vehicle registration plate, on the basis of the two-dimensional data generated by the two-dimensional data generation unit 230. As a result, the recognition rate of number information (object information) written on a vehicle registration plate (object) can be improved.

Sixth Embodiment

In a sixth embodiment, the recognition unit 250 performs a recognition process on a traffic sign provided at the side of a road. The recognition unit 250 in accordance with any one of the first to fourth embodiment may be applied to the recognition process of a traffic sign. The sixth embodiment will now be described in detail.

In the sixth embodiment, the image acquisition apparatus 100 is provided in a vehicle. The first image acquisition unit 110 and the second image acquisition unit 120 capture images of a traffic sign. The distance image generation unit 210 generates a distance image on the basis of the images of the traffic sign acquired by the second image acquisition unit 120.

The three-dimensional data generation unit 220 generates three-dimensional data of the traffic sign on the basis of the image of the traffic sign acquired by the first image acquisition unit 110 and the distance image generated by the distance image generation unit 210. The two-dimensional data generation unit 230 flattens the three-dimensional data generated by the three-dimensional data generation unit 220 to generate two-dimensional data.

The recognition image generation unit 240 generates a recognition image that is used to recognize the traffic sign, on the basis of the two-dimensional data generated by the two-dimensional data generation unit 230. As a result, the recognition rate of information (object information) written on a traffic sign (object) can be improved.

Although it is assumed in the first to sixth embodiments that the distance image generation unit 210 generates a distance image on the basis of images captured by a stereo camera or a light-field camera, this is not limiting. For example, the second image acquisition unit 120 may be a distance sensor that measures a distance between a reference position and the package 400. In this case, the distance image generation unit 210 may generate a distance image on the basis of the distance measured by the distance sensor.

Although it is assumed in the first to sixth embodiments that the image processing apparatus 200 includes the recognition unit 250, this is not limiting. For example, the recognition unit 250 may be provided in an OCR apparatus that can communicate with the image processing apparatus 200.

According to at least one of the above embodiments, the image processing apparatus 200 has the three-dimensional data generation unit 220, the two-dimensional data generation unit 230, and the recognition image generation unit 240. The three-dimensional data generation unit 220 generates three-dimensional data of the package 400 to which address information is attached, on the basis of an image of the package 400, and a distance image that indicates a distance between a reference position and the package 400 for each pixel. The two-dimensional data generation unit 230 flattens the three-dimensional data generated by the three-dimensional data generation unit 220 to generate two-dimensional data. The recognition image generation unit 240 generates a recognition image that is used to recognize the address information, on the basis of the two-dimensional data generated by the two-dimensional data generation unit 230. As a result, the recognition rate of the address information (object information) attached to the package 400 (object) can be improved.

Note that the image processing apparatus 200 of the above embodiments includes a computer system. The above steps performed by the image processing apparatus 200 are each stored in the form of a program in a computer-readable storage medium, and performed by a computer reading and executing the program. Here, the computer-readable storage medium refers to a magnetic disk, a magneto-optical disk, a CD-ROM, a DVD-ROM, a semiconductor memory, etc. Alternatively, the computer program may be distributed to a computer through a communication line, and the computer that has received the computer program may execute the program.

The above embodiments may be expressed as follows.
An image processing apparatus includes:
a storage unit configured to store information;
a hardware processor configured to execute a program stored in the storage unit,
wherein
the storage unit stores the program which causes the hardware processor to execute
generating three-dimensional data of an object on the basis of an image of the object on which object information represented by a character or a symbol is attached, and a distance image indicating a distance between a reference position and the object for each pixel,
flattening the three-dimensional data to generate two-dimensional data, and
generating a recognition image which is used to recognize the object information, on the basis of the two-dimensional data.

The above embodiments may also be expressed as follows.
An image processing apparatus includes:
a storage unit configured to store information;
a processor configured to execute a program stored in the storage unit,
wherein
the processor executes the program to function as
a three-dimensional data generation unit configured to generate three-dimensional data of an object on the basis of an image of the object on which object information represented by a character or a symbol is attached, and a distance image indicating a distance between a reference position and the object for each pixel,
a two-dimensional data generation unit configured to flatten the three-dimensional data generated by the three-dimensional data generation unit to generate two-dimensional data, and
a recognition image generation unit configured to generate a recognition image which is used to recognize the object information, on the basis of the two-dimensional data generated by the two-dimensional data generation unit.

While several exemplary embodiments have been described, these exemplary embodiments are merely for illustrative purposes, and are in no way intended to limit the scope of the invention. These embodiments can be implemented in various other forms. Various omissions, substitutions, and changes can be made to these embodiments without departing the scope and spirit of the invention. These embodiments and their modifications are encompassed by the scope and spirit of the invention, and also by the scope of the invention set forth in the claims and their equivalents.

What is claimed is:

1. An image processing apparatus comprising a processing circuit to function as
a three-dimensional data generation unit configured to generate three-dimensional data of an object on the basis of an image of the object on which object information represented by a character or a symbol is attached, and a distance image indicating a distance between a reference position and the object for each pixel,
a two-dimensional data generation unit configured to flatten the three-dimensional data generated by the three-dimensional data generation unit to generate two-dimensional data, and
a recognition image generation unit configured to generate a recognition image which is used to recognize the object information, on the basis of the two-dimensional data generated by the two-dimensional data generation unit,
wherein the three-dimensional data generation unit includes
a noise removal unit configured to remove noise from the distance image,
a scaling unit configured to adjust a scale in a height direction of the object in the distance image from which the noise has been removed by the noise removal unit, on the basis of a scale in a transverse direction of the image of the object and a scale in a longitudinal direction of the image of the object,
a modeling unit configured to calculate coordinates in three-dimensional space of each pixel of the object, on the basis of the distance image for which the scale in the height direction of the object has been adjusted by the scaling unit, and
a three-dimensional mapping unit configured to generate the three-dimensional data on the basis of the coordinates in three-dimensional space calculated by the modeling unit, and the image of the object.

2. The image processing apparatus according to claim 1, wherein the modeling unit weights distance information contained in the distance image on the basis of reliability with which the distance image has been acquired, to generate the three-dimensional data.

3. The image processing apparatus according to claim 1, wherein
the two-dimensional data generation unit includes
a base plane detection unit configured to detect a base plane which is a reference to a position of the object, and
a flattening unit configured to flatten the three-dimensional data generated by the three-dimensional data generation unit, with reference to the base plane detected by the base plane detection unit, to generate the two-dimensional data.

4. The image processing apparatus according to claim 3, wherein
the flattening unit lowers the coordinate in a height direction of each point in the three-dimensional data to a height of the base plane while maintaining a distance between each point.

5. The image processing apparatus according to claim 1, wherein
the recognition image generation unit performs a super-resolution imaging process for enhancing a resolution on the two-dimensional data generated by the two-dimensional data generation unit.

6. The image processing apparatus according to claim 5, wherein
the recognition image generation unit performs, on the two-dimensional data, the super-resolution imaging process in which self-similarity is used.

7. The image processing apparatus according to claim 5, wherein
the recognition image generation unit performs, on the two-dimensional data, the super-resolution imaging process in which an initial image is generated by nearest neighbor search.

8. The image processing apparatus according to claim 5, wherein
the recognition image generation unit performs the super-resolution imaging process on the two-dimensional data, to generate a binarized image having an enhanced resolution as the recognition image.

9. The image processing apparatus according to claim 1, further comprising: a reflection region detection unit configured to detect a region around the object information where light is reflected, in the image of the object; and a reflection reduction unit configured to reduce a light reflection in the two-dimensional data generated by the two-dimensional data generation unit, by image processing, on the basis of the region detected by the reflection region detection unit.

10. The image processing apparatus according to claim 9, wherein
the reflection region detection unit distinguishes a blank portion of the region where the object information is written, from a portion in which clipping occurs due to specular reflection, on the basis of the three-dimensional data.

11. The image processing apparatus according to claim 9, wherein
the reflection reduction unit reduces the light reflection in the region detected by the reflection region detection unit, by performing hole-filling using surrounding pixels by inpainting.

12. An image processing system comprising:
an image acquisition apparatus having a sensor and to acquire, using the sensor, an image of an object on which object information represented by a character or a symbol is attached; and
an image processing apparatus to generate a recognition image which is used to recognize the object information, wherein
the image processing apparatus includes a processing circuit to function as
a three-dimensional data generation unit configured to generate three-dimensional data of the object on the basis of the image of the object acquired by the image acquisition apparatus, and a distance image indicating a distance between a reference position and the object for each pixel,
a two-dimensional data generation unit configured to flatten the three-dimensional data generated by the three-dimensional data generation unit to generate two-dimensional data, and
a recognition image generation unit configured to generate the recognition image on the basis of the two-dimensional data generated by the two-dimensional data generation unit,
wherein the three-dimensional data generation unit includes
a noise removal unit configured to remove noise from the distance image,
a scaling unit configured to adjust a scale in a height direction of the object in the distance image from which the noise has been removed by the noise removal unit, on the basis of a scale in a transverse direction of the image of the object and a scale in a longitudinal direction of the image of the object,
a modeling unit configured to calculate coordinates in three-dimensional space of each pixel of the object, on the basis of the distance image for which the scale in the height direction of the object has been adjusted by the scaling unit, and
a three-dimensional mapping unit configured to generate the three-dimensional data on the basis of the coordinates in three-dimensional space calculated by the modeling unit, and the image of the object.

13. An image processing method comprising:
generating three-dimensional data of an object on the basis of an image of the object on which object information represented by a character or a symbol is attached, and a distance image indicating a distance between a reference position and the object for each pixel;
flattening the three-dimensional data to generate two-dimensional data; and
generating a recognition image which is used to recognize the object information, on the basis of the two-dimensional data,
wherein generating three-dimensional data of the object includes
removing noise from the distance image,
adjusting a scale in a height direction of the object in the distance image from which the noise has been removed, on the basis of a scale in a transverse direction of the image of the object and a scale in a longitudinal direction of the image of the object,
calculating coordinates in three-dimensional space of each pixel of the object, on the basis of the distance image for which the scale in the height direction of the object has been adjusted, and
generating the three-dimensional data on the basis of the calculated coordinates in three-dimensional space.

14. non-transitory computer readable medium storing computer readable instructions thereon that, when executed by a computer, causes the computer to perform a method comprising:
generating three-dimensional data of an object on the basis of an image of the object on which object information represented by a character or a symbol is attached, and a distance image indicating a distance between a reference position and the object for each pixel;

flattening the three-dimensional data to generate two-dimensional data; and
generating a recognition image which is used to recognize the object information, on the basis of the two-dimensional data,
wherein generating three-dimensional data of the object includes
   removing noise from the distance image,
   adjusting a scale in a height direction of the object in the distance image from which the noise has been removed, on the basis of a scale in a transverse direction of the image of the object and a scale in a longitudinal direction of the image of the object,
   calculating coordinates in three-dimensional space of each pixel of the object, on the basis of the distance image for which the scale in the height direction of the object has been adjusted, and
   generating the three-dimensional data on the basis of the calculated coordinates in three-dimensional space.

* * * * *